(12) United States Patent
Nicholson (10) Patent No.: US 9,851,034 B2
(45) Date of Patent: Dec. 26, 2017

(54) COUPLING

(71) Applicant: Parker Hannifin Manufacturing Limited, Hemel Hempstead, Hertfordshire (GB)

(72) Inventor: Spencer Andrew Nicholson, Devon (GB)

(73) Assignee: Parker Hannifin Manufacturing Limited, Hemel Hempstead, Hertfordshire (GB)

( * ) Notice: Subject to any disclaimer, the term of this patent is extended or adjusted under 35 U.S.C. 154(b) by 125 days.

(21) Appl. No.: 14/566,107

(22) Filed: Dec. 10, 2014

(65) Prior Publication Data
US 2015/0091298 A1    Apr. 2, 2015

Related U.S. Application Data

(63) Continuation of application No. 13/646,192, filed on Oct. 5, 2012, now abandoned, which is a continuation
(Continued)

(30) Foreign Application Priority Data

Feb. 25, 2005  (GB) .................................. 0502954.0
Jul. 22, 2005  (GB) .................................. 0515165.9

(51) Int. Cl.
*F16L 13/14*     (2006.01)
*F16L 21/00*     (2006.01)
(Continued)

(52) U.S. Cl.
CPC .......... *F16L 21/007* (2013.01); *F16L 13/146* (2013.01); *F16L 19/10* (2013.01); *F16L 19/14* (2013.01);
(Continued)

(58) Field of Classification Search
CPC ........ F16L 13/14; F16L 13/146; F16L 21/007
(Continued)

(56) References Cited

U.S. PATENT DOCUMENTS 1,969,142 A      8/1934  McIntyre
2,613,959 A  *  10/1952  Richardson ........... F16L 19/106
                                                        285/341
(Continued)

FOREIGN PATENT DOCUMENTS

DE         4116610      11/1992
DE     198 56 523 C1     3/2000
(Continued)

OTHER PUBLICATIONS

International Search Report for corresponding International Application No. PCT/GB2006/000561, dated Apr. 26, 2006.
Opposition to European Patent No. EP1851475, dated Oct. 1, 2014.

*Primary Examiner* — Aaron Dunwoody
(74) *Attorney, Agent, or Firm* — Thomas G. Fistek (57) ABSTRACT

A coupling for attaching to an end of a tube, pipe, conduit or other round solid or hollow section. The coupling includes an inner body and a collar to be provided around the inner body. The inner body has an interior bore passing through at least a portion thereof to receive a tube and the bore has one or more interior annular protuberances extending into the bore. When the collar is provided around the inner body it applies a circumferential compressive force to deform the inner body such that the one or more annular protuberances engage the tube to seal with it.

8 Claims, 9 Drawing Sheets

Related U.S. Application Data of application No. 12/984,265, filed on Jan. 4, 2011, now abandoned, which is a continuation of application No. 11/836,180, filed on Aug. 9, 2007, now abandoned, which is a continuation of application No. PCT/GB2006/000035, filed on Feb. 17, 2006.

(51) Int. Cl.
    *F16L 19/10*     (2006.01)
    *F16L 19/14*     (2006.01)
    *F16L 37/138*     (2006.01)
    *F16L 21/08*     (2006.01)

(52) U.S. Cl.
    CPC ............. *F16L 21/08* (2013.01); *F16L 37/138* (2013.01); *Y10T 29/49927* (2015.01); *Y10T 29/49934* (2015.01)

(58) Field of Classification Search
    USPC ............... 285/382.7, 382, 382.1, 382.2, 247; 29/515, 520
    See application file for complete search history.

(56) References Cited

U.S. PATENT DOCUMENTS

| | | | |
|---|---|---|---|
| 3,149,860 A | 9/1964 | Hallesy | |
| 3,290,069 A * | 12/1966 | Davis ..................... | F16L 19/10 285/341 |
| 3,375,026 A | 3/1968 | Zoltan | |
| 3,471,181 A * | 10/1969 | Fuentes .................. | F16L 19/10 285/341 |
| 3,498,648 A | 3/1970 | Hallesy | |
| 3,627,727 A | 12/1971 | Tholstrup | |
| 3,857,591 A * | 12/1974 | Voss ........................ | F16L 19/12 285/341 |
| 3,889,989 A | 6/1975 | Legris | |
| 3,893,720 A | 7/1975 | Moebius | |
| 3,994,517 A | 11/1976 | Carmichael | |
| 4,026,006 A | 5/1977 | Moebius | |
| 4,061,367 A | 12/1977 | Moebius | |
| 4,134,700 A | 1/1979 | Nelson | |
| 4,189,817 A | 2/1980 | Moebius | |
| 4,257,135 A | 3/1981 | Moebius | |
| 4,482,174 A | 11/1984 | Puri | |
| 4,483,056 A | 11/1984 | Schwalm | |
| 4,647,066 A | 3/1987 | Maxwell | |
| 4,705,302 A | 11/1987 | Beiley | |
| 4,858,968 A | 8/1989 | Moebius | |
| 5,110,163 A | 5/1992 | Benson | |
| 5,114,191 A * | 5/1992 | Sareshwala ........... | F16L 13/146 285/115 |
| 5,181,752 A | 1/1993 | Benson | |
| 5,305,510 A | 4/1994 | Croft | |
| 5,347,701 A | 9/1994 | Hosseinian | |
| 5,351,997 A | 10/1994 | Webb | |
| 5,709,416 A | 1/1998 | Benson | |
| 5,947,532 A | 9/1999 | Lorenz | |
| 6,073,976 A | 6/2000 | Schmidt | |
| 6,131,963 A | 10/2000 | Williams | |
| 6,131,964 A * | 10/2000 | Sareshwala ........... | F16L 13/146 285/382 |
| 6,364,371 B1 | 4/2002 | McKay | |
| 6,378,913 B1 | 4/2002 | Werner | |
| 6,434,809 B1 | 8/2002 | McKay | |
| 6,467,752 B2 | 10/2002 | Woods | |
| 6,616,919 B2 | 9/2003 | McKay | |
| 6,692,040 B1 * | 2/2004 | McKay ................. | F16L 13/146 285/382 |
| 6,769,722 B1 * | 8/2004 | Krauleidis ............. | B21D 39/04 285/382 |
| 7,707,032 B2 | 4/2010 | Wang | |
| 8,550,504 B2 | 10/2013 | Danhash | |
| 2005/0055454 A1 | 3/2005 | Welck | |
| 2005/0183258 A1 | 8/2005 | McKay | |
| 2005/0264006 A1* | 12/2005 | McKay ................. | F16L 13/146 285/256 |
| 2006/0059677 A1 | 3/2006 | McKay | |
| 2006/0186666 A1* | 8/2006 | McKay ................. | F16L 13/146 285/382 |
| 2006/0284415 A1 | 12/2006 | McKay | |
| 2010/0207387 A1 | 8/2010 | Strompel | |

FOREIGN PATENT DOCUMENTS

| | | |
|---|---|---|
| DE | 100 21 306 C2 | 11/2001 |
| DE | 10105013 | 11/2002 |
| EP | 0 309 179 A | 3/1989 |
| EP | 0863354 A1 | 9/1998 |
| EP | 1 700 059 B1 | 5/2011 |
| GB | 928715 | 6/1963 |
| GB | 0066033 | 12/1982 |
| GB | 0379051 | 7/1990 |
| GB | 0427306 | 5/1991 |
| GB | 2265680 | 6/1993 |
| GB | 2275090 | 8/1994 |
| GB | 0667476 | 8/1995 |
| GB | 0867597 | 8/1998 |
| JP | 08035588 | 2/1998 |
| TW | 4693322 | 12/2001 |
| WO | 0034706 | 6/2000 |
| WO | 0142700 | 6/2001 |
| WO | 05019716 | 3/2005 |
| WO | 05019717 | 3/2005 |
| WO | 2005/066 533 A1 | 7/2005 |
| WO | 2006/089 396 A1 | 8/2006 |

* cited by examiner

COUPLING

CROSS REFERENCE TO RELATED APPLICATIONS

This application is a continuation of U.S. patent application Ser. No. 13/646,192, filed Oct. 5, 2012, now Pub. No. US 2013/0025731, which is a continuation of U.S. patent application Ser. No. 12/984,265, now Pub. No. 2011/0095529 filed Jan. 4, 2011, Which is a continuation of U.S. patent application Ser. No. 11/836,180, filed Aug. 9, 2007, now Pub. No. US 2008/0001404, which is a continuation of International Application No. PCT/GB06/000035, filed Feb. 17, 2006, which application designated the United States, and which application claims priority to Great Britain Patent Application No. 0502954.0, filed Feb. 25, 2005, and Great Britain Patent Application No. 0515165.9, filed Jul. 22, 2005, the disclosure of Pub. No. US 2008/0001404 being expressly incorporated herein by reference.

BACKGROUND OF THE INVENTION

The present invention relates to a coupling for attaching tubes, pipes, conduits and other round sections to other such items and/or other systems.

Initially this invention has been developed within the instrumentation tube fittings industry. However, the invention is capable of being utilised within many other applications outside of this environment. Other applications ma include shipbuilding, aerospace, automotive, pipe connections, and construction using wire e.g. suspension bridges.

At present a commonly used connector is a ferrule compression fitting comprising one or more ferrules to be threaded over a tube or the like and a tightening device to cause the one or more ferrules to grip the outside of the tube or the like to provide a seal against leakage. GB 928,715 and U.S. Pat. No. 6,131,963 show examples of twin ferrule connectors. WO 2005/019716 discloses a tube fitting for a tube end, the tube fitting comprising a body with an interior bore to receive a tube end and a collar to be threadably coupled onto the body. The collar includes an integral tube gripping ring that co-operates with a camming surface on the body when the collar is threaded onto the body to force the ring to plastically deform into the tube end. WO 2005/019717 discloses a tube fitting for a tube end, the tube fitting comprising a female threaded coupling member and a male threaded coupling member that are threaded together to assemble the fitting onto a tube end. Whilst being threaded together, a ferrule is detached from the female threaded coupling to form a separate ferrule fitting which is plastically deformed against the outer wall of the tube end and forms seals with the male coupling member and the tube end.

The following problems are associated with these designs:

The design relies on the use of controlled material specifications to ensure that the ferrules have enhanced mechanical properties over that of the tube.

The rear ferrule is treated by one of many processes to enhance the surface hardness. This in itself can cause issues as traditional hardening methods such as nitriding induces carbon into the material, which reduces the surfaces corrosion resistance.

Tube selection is critical within the design. The tubing used with these fittings often has to be purchased with special restrictions of some properties such as skin hardness. Incorrect tube preparation can cause major problems within the assembly of the fitting and this is one aspect that, the manufacturer has no control over.

Longitudinal scratches on the tube can cause leak paths with these fittings. Basic tube handling commonly causes these scratches. These minor surface defects are often manually removed prior to assembly, which adds to the assembly time.

Due to the requirement of enhanced materials it is accepted that compression fittings manufactured from austenitic stainless steel are not suitable for use within certain environments and do not comply with the National Association of Corrosion Engineers ("NACE") standards.

The method used to assemble as tube into a compression fitting relies on the end user adjusting the fitting until tube grip is achieved such as by using a threaded connection. This is detected by feel and thus every user will have their own opinion of when this is met. Once this point has been achieved the nut of the fitting is tightened by 1¼ turns and not to a specified torque or a dead stop. This is seen by a limitation within certain fields such as the automotive industry.

A variety of methods have been used in the past to overcome these issues.

SUMMARY OF THE INVENTION

Embodiments of the invention disclosed herein provide a new type of coupling which eliminate or alleviate at least some of the above problems.

According to a first aspect of the present invention there is provided a coupling for attaching to an end of a tube, pipe, conduit or other round solid or hollow section, the coupling comprising:

an inner body with an interior bore passing through at least a portion thereof to receive a tube or the like, the bore having one or more interior annular protuberances extending into the bore, and a collar to be provided around the inner body to apply a circumferential compressive force to deform the body, such that, in use, when a tube or the like is received in the bore of the body and the collar applies a circumferential compressive force thereto, the body is deformed such that the one or more annular protuberances engage the tube or the like to seal with it.

The coupling requires only two parts reducing manufacturing costs and making assembly straightforward. Furthermore as the body, which has one or more interior annular protuberances which extend into the bore prior to use, is deformed such that the one or more annular protuberances provided thereon are forced into engagement with the tube or like, it has been found that a particularly robust seal is provided. The tube or the like is retained in the inner body providing considerable resistance to being axially withdrawn.

The body preferably has a frusto-conical or cylindrical portion with the bore and one or more interior annular protuberances therein, and is preferably arranged such that the collar may be provided around the frusto-conical or cylindrical portion so that, in use, the frusto-conical or cylindrical portion is deformed by the collar.

As the inner body upon which the annular protuberances are provided is deformed, the annular protuberances can undergo a larger radial displacement than conventional ferrules. This larger radial displacement enables higher compressive loads to be placed on the tube or the like providing better seals and grip and the coupling can be used with tubes or the like with larger dimensional tolerances than conventional ferrule couplings. Furthermore, the large radial displacement of the annular protuberances compresses the cross-section of the tube or the like where they engage which splays the tube or the like on either side. The splaying of the tube or the like on either side enhances the resistance to withdrawal of the tube or the like from the coupling. The larger radial displacement of the annular protuberances enables the coupling to be used with tube or the like which has not been specially prepared and which may have scratches reducing preparation time for the tube and thus costs. Furthermore, unlike conventional ferrule fittings, the tube or the like does not need to abut against a stop within the coupling as the protuberances provide such a good seal. This overcomes the need for the end of the tube or the like to be cut precisely square, further reducing preparation time and costs. The larger radial displacement of this coupling compared to conventional ferrule fittings provides larger threes such that the material of the engaging protuberances does not need to be specially hardened unlike conventional ferrule fittings. However, the protuberances could, if desired, be hardened for advanced performance. The larger radial displacement of this coupling also ensures that the protuberances engage all points around the circumference of a tube or the like, even when its cross-section is not precisely round. For example a tube or the like with a slightly oval cross-section will be pushed back into shape and a better connection will be made compared to conventional fittings.

The interior annular protuberances on the inner body may compress the outside of the tube or like to which it is fitted. However, the interior annular protuberances preferably have a cutting surface to breach the skin of a tube or the like to which it is fitted. The skin of a tube or the like has a higher level of hardness than its core material resulting from its manufacture. By the cutting surface being able to breach the skin of a tube or the like to reach the softer core material, a superior seal and resistance to axial removal of the tube or like is obtained.

Any number or size of interior annular protuberances ma be provided depending upon requirements. If more interior annular protuberances are provided, a more robust seal is achieved.

A female screw thread may be provided in the interior of the bore. The screw thread may replace one or more of the interior annular protuberances. A screw thread is generally easier to manufacture than an interior annular protuberance. For example, one, two or three of the interior annular protuberances nearest to the open end of the claw end may be replaced by a screw thread. However, when a screw thread is provided, there is preferably still at least one interior annular protuberance still provided in the interior of the bore to engage a tube/pipe or the like to be inserted into the bore, in use the screw thread will deform in a similar manner to the annular protuberances which will in turn cause the tube/pipe or the like to deform and thus cause a "bite" effect.

The collar may be arranged to apply a circumferential compressive three to deform the body in any suitable way, for example a so-called shaft clamp, hub clamp or hose type "jubilee" clamp may be used. However, the inner body and the collar preferably each have complimentary camming surfaces inclined to their axes which co-act to apply the circumferential compressive three to deform the body. The collar and the inner body are preferably arranged to be moved relatively towards each other so that the camming, surfaces co-act. The collar and the inner body may be moved towards each other by any suitable means, such as by using an appropriate tool or by using corresponding threads on the inner body and collar such that the collar is rotated relative to the inner body to pull it over the inner body. The complimentary camming surfaces may be inclined at any desirable corresponding angles to provide a longer or shorter distance over Which the inner body and collar may be moved towards each other. The complimentary camming surfaces may be provided by an external frusto-cone on the inner body and a corresponding frusto-conical inner surface within the collar. One or both of the camming surfaces could be provided with a friction reducing coating or plating to reduce the threes required during use.

Once the collar and inner body are moved towards each other sufficiently, a holding means keeps them in the desired relative positions. The holding means may be an interference fit.

According to a second aspect of the present invention there is provided a method of attaching a coupling to an end of a tube, pipe, conduit or other round solid or hollow section, the method comprising:

providing a tube or the like into a bore passing through at least a portion of an inner body, the bore having one or more interior annular protuberances extending into the bore; and providing a collar around the inner body and using the collar to apply a circumferential compressive force thereto so that the body is deformed bringing the one or more annular protuberances into engagement with the tube or the like.

BRIEF DESCRIPTION OF THE DRAWINGS

Embodiments of the present invention will now be described by way of example only, with reference to the accompanying drawings in which:

FIG. 7 shows a perspective view of a collar and an inner member pre-assembled onto a tube or the like;

DETAILED DESCRIPTION OF THE INVENTION

The following examples discuss the invention being used in conjunction with a traditional tube. However the invention can also be used with a pipe, solid rod, wire rod or any other round section.

Embodiments of the invention include a method of attaching a coupling and a coupling that can for example, be machined into a traditional coupling, as will be shown in the following example, or machined onto existing equipment such as, but not limited to, valves, manifolds, pumps, hoses etc. The coupling comprises an inner body or a sealing member as shown for example in FIGS. 1 and 2 and a separate section or collar as shown for example in FIG. 3, which is used to modify the form of the sealing member.

Figure 1:
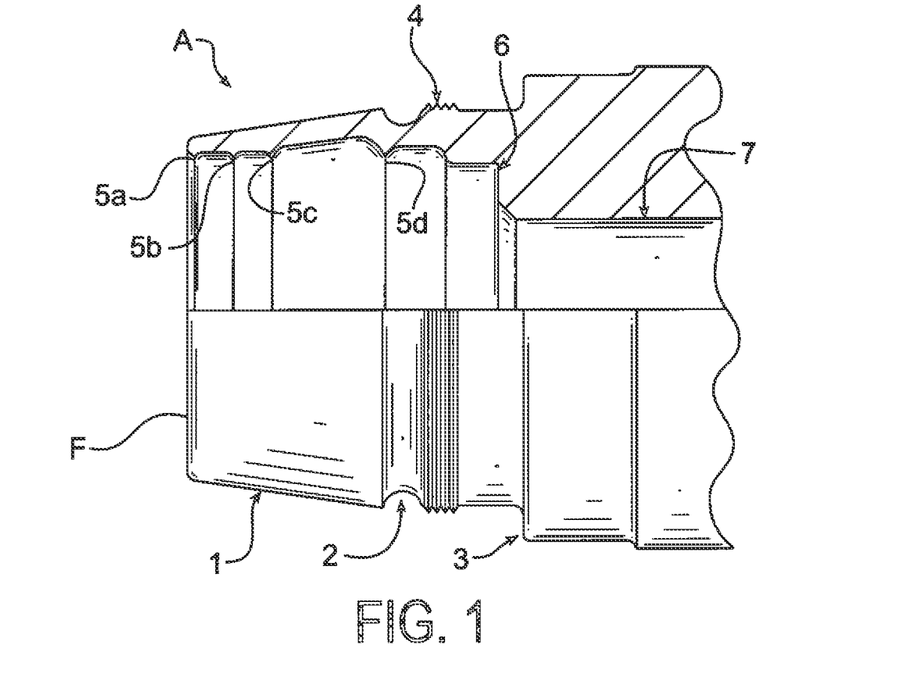
FIG. 1 shows an inner member partially in cross-section.
Figure 2:
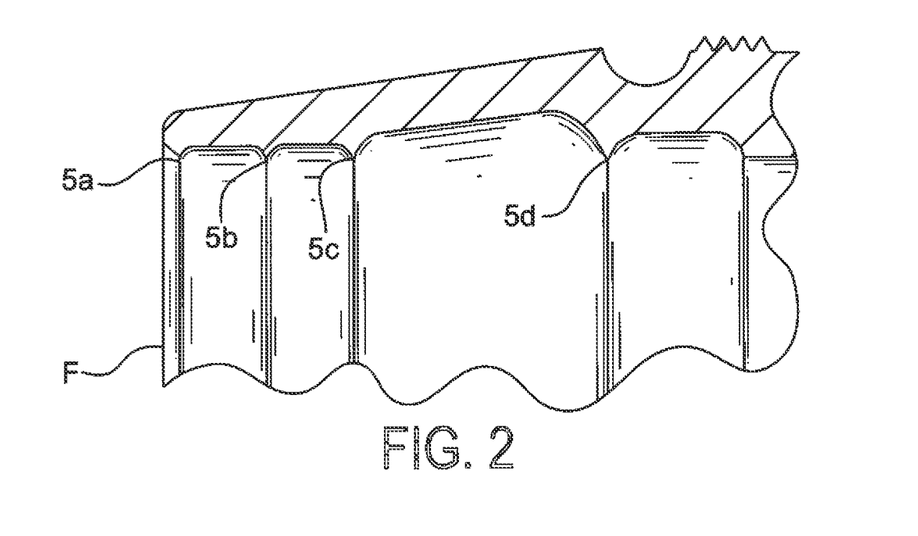
FIG. 2 shows an enlarged view of a portion of the inner member.

The sealing member seals against a tube and also retains the tube in position. This member will be referred to as the claw end in the following description and is shown in FIGS. 1 and 2.

In this example the claw end A has an outside surface with an external frusto-cone 1 which is inclined to the axis of the claw end, in this example by around 20°, and which has a semi-circular groove 2 at the large end of the frusto-cone. Other groove cross-sections have been proven to give the same result such as a square form which may have radii in each corner. A large shoulder 3 is provided, which is used as a positive stop that will be discussed later. There is also a portion between the semi-circular groove 2 and the large shoulder 3 that contains a number of small grooves 4. These grooves 4 are to give an interference fit which will be discussed later. These grooves 4 can also be replaced by other means to provide an interference fit such as a plain portion or a slightly tapered portion. Other combinations of angles, grooves and serrations have also been proven to give adequate functionality.

Internally within the claw end A there are a number of interior annular protuberances or teeth 5*a-d* that can be generated with either sharp points, smith radii of around 0.2 mm or small flat lands of around 0.2 mm width. Each of the teeth 5*a-d* are axially spaced-apart. Tooth 5*d* is spaced-apart rearwardly from the nearest one 5*c* of the rest of the teeth 5*a-c* at a distance greater than the spacing between the rest of the teeth 5*a-c* which otherwise are disposed adjacent the forward end, F, of the claw end A. It should be noted that in this example four teeth are shown but any number of teeth can be utilised depending upon performance requirements.

Inwardly from the open end of the claw end, beyond the teeth 5, this example shows a plain cylindrical portion that is concluded by an internal shoulder 6. This shoulder 6 then leads into a smaller internal bore 7. It Should be noted that the invention does not require the internal shoulder 6 resulting in the bore 7 being of similar diameter to that of the teeth 5. The internal shoulder 6 is utilised only as a guide for tube/pipe insertion depth and can be achieved by using other methods such as a marking on an inserted tube to indicate minimum/maximum tube insertion.

The second member is the component which provides the profile, which will be compressed onto the first member, the claw end A. This second member will be referred to as the collar B and examples of it are shown in FIGS. 3, 4, 5 and 6.

Figure 3:
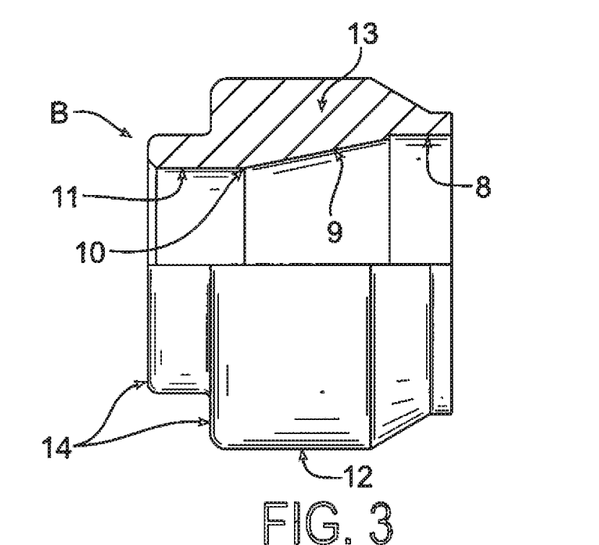
FIG. 3 shows a collar partially in cross-section.

In this example the internal profile of the collar includes a plain cylindrical portion 8, which is designed to give an interference fit with the grooved section 4 of the claw end. This plain cylindrical portion 8 could be replaced by a slightly tapered portion or a grooved portion (similar to that of the grooved portion on the claw end 4) that would also generate an interference fit. Other profiles have also been used such as a small lip and/or an additional spring clip. The form then changes to an internal taper 9, in this example of around 20° inclusive. However, any taper could be provided for example between 5° and 80° or between 10° and 30°, This internal frusto-conical profile 9 is then transferred into a small step 10 that contains a large radius at the interchange between the cone 9 and the step 10. There is also a plain cylindrical bore 11 through the remainder of the collar through which a tube/pipe will pass through. Other combinations of angles, grooves and serrations have also been proven to give adequate functionality.

The external profile 12 of the collar, unlike most existing tube fittings can be manufactured from any available material section e.g. round, hexagonal, square cross-section. The only requirement of this external profile is that adequate wall thickness 13 between the internal cone 9 and the external profile 12 is provided, so that swelling of the external profile 12 is restricted. This restriction ensures that the deformation generated by the two engaging frusto-cones 1 & 9 is produced internally onto the tube and not externally onto the collar external profile 12.

The last profile of the external form of the collar B is by means of a number of solid face(s) 14 which are perpendicular to the axis of the internal profile. This profile will be utilised to force the collar B onto the claw end A. It should be noted that although in the example of FIG. 3 the profile 14 is provided at the same end of the collar as the plain bore 11, this profile 14 which is utilised to force the collar onto the claw end could be provided by means of an undercut 15 in the external profile 12 of the collar as shown in FIG. 4 or an additional shoulder 16 as shown in FIG. 5.

Figure 4:
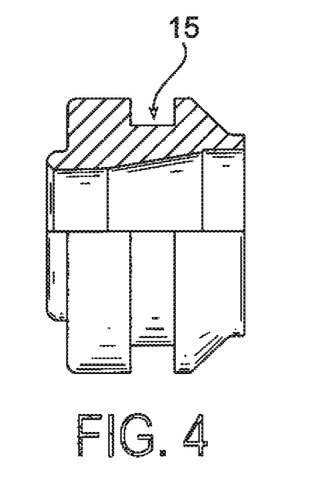
FIG. 4 shows another collar partially in cross-section.
Figure 5:
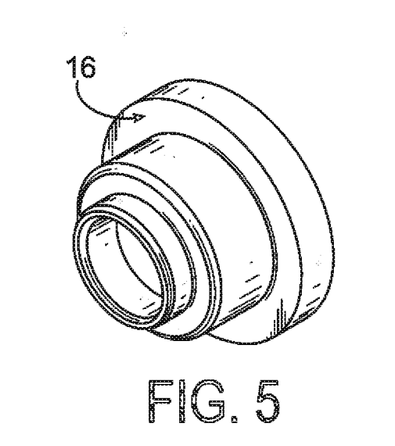
FIG. 5 shows a perspective view of another collar.
Figure 6:
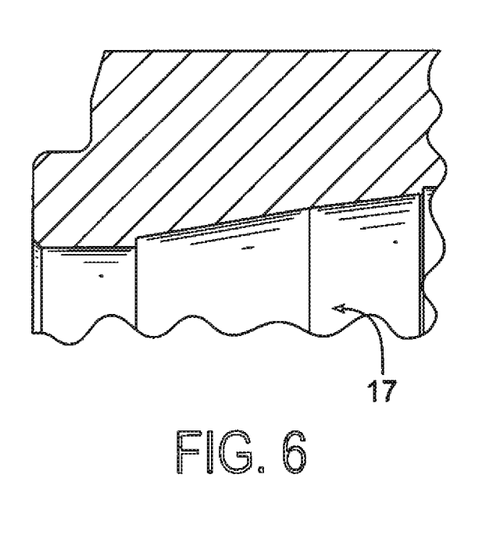
FIG. 6 shows a cross-section of another collar.

It is important to note that although in FIGS. 3 and 4 the internal frusto-cone 9 is shown as one continuous angle, it would also be possible to utilize two or more angles 17 as shown in FIG. 6 to change the rate of deformation at any given point during compression.

It should also be noted that in both components a frusto-cone inclined to the component axes by around 20° has been described. However, other angles would be acceptable for use. By lessening the angle the amount of compression generated per unit of collar movement would be reduced, as would the force required to generate this movement. A larger angle would have the opposite effect. The inclination can be selected appropriately for envisaged uses of particular connectors.

Figure 7:
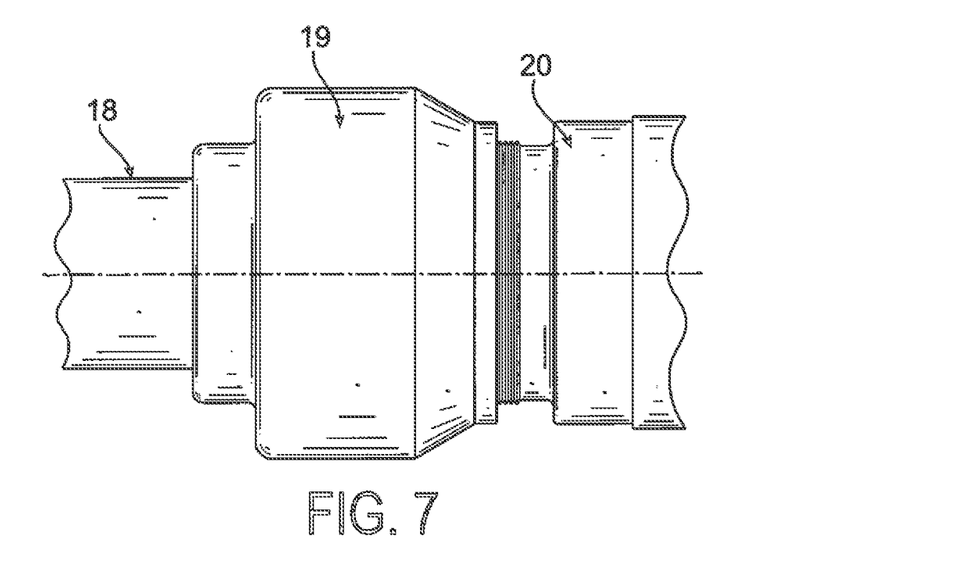
Figure 8:
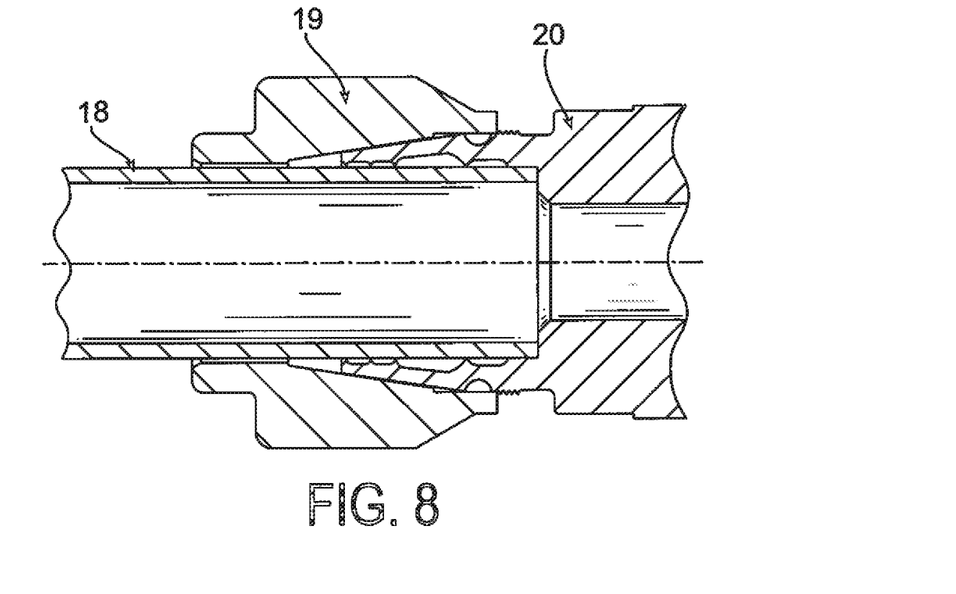
FIG. 8 shows a cross-sectional view of a collar being moved axially relative to an inner member.

The pre-assembled components are shown in a perspective view in FIG. 7 and in cross-section in FIG. 8. In use a piece of tube 18 is inserted through the plain bore 11 of the collar 19. The tube is then inserted through the internal profile of the claw end 20 ensuring that the tube travels past the last tooth 5 and into the plain cylindrical portion, and abutment face 6. In this example the tube is inserted to a dead stop, however this feature is not a necessity and can be omitted if required, providing an alternative method of ensuring that the tube is inserted to the correct distance is provided.

Once the tube 18 is in place, the collar 19 is forced onto the claw end 20. In this example this three is generated by an external method such as a hydraulic ram, a pneumatic ram or an electrical linear slide, such that the two components are 'simply' pushed together. However, the collar 19 can be forced onto the claw end 20 by any suitable method.

Figure 9:
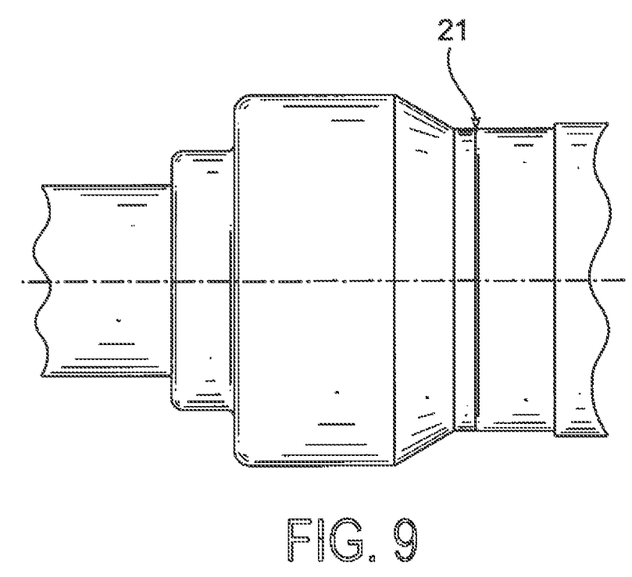
FIG. 9 shows a perspective view of a collar on an inner member after activation.

As the collar 19 is forced over the external frusto-cone 1 of the claw end 20, the external frusto-cone 1 engages with the internal frusto-cone 9 or cones 17 of the collar. In this example the solid face 14 would be used to apply the linear force until the opposite end of the collar makes contact 21 with the shoulder 3 of the claw end as shown in FIG. 9.

Figure 10:
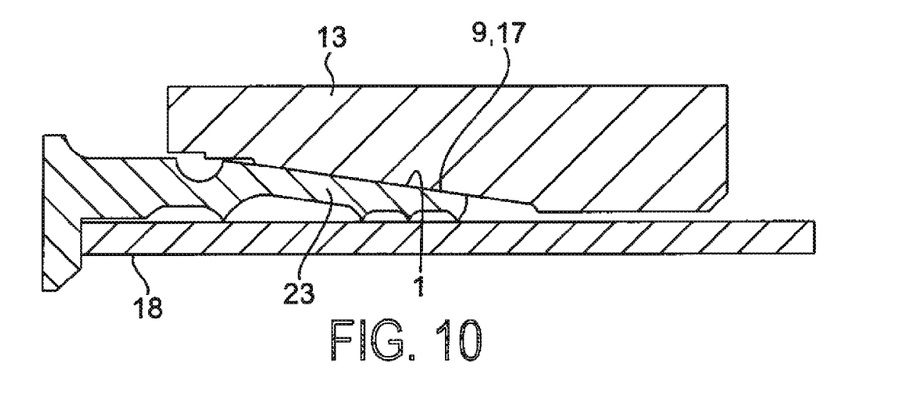
FIGS. 10 to 12 show the various stages of a collar being moved axially relative to an inner member.
Figure 11:
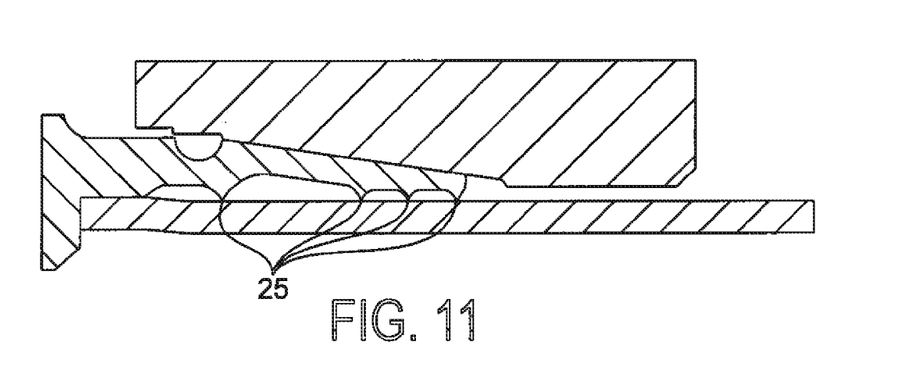
Figure 12:
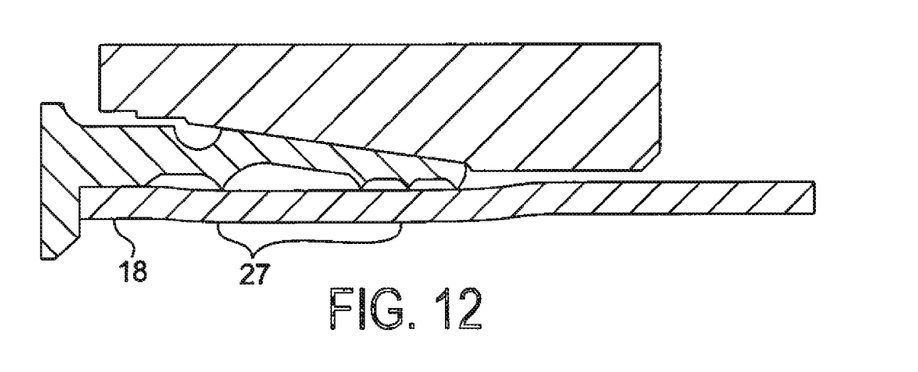

Internally during compression, the form of the end of the claw end alters as shown in FIGS. 10 to 12. The components are supplied with the collar fitted to the end of the claw end and retained by means of an interference fit. In FIG. 10 the tube is shown fully inserted. During compression the internal tapered portion 9 & 17 of the collar engages with the external frusto-cone 1 of the claw end. Providing that the thickness of the collar 13 is adequate to resist the hoop strength of the claw ends section 23, the them of the claw end will begin to compress inwards. This compression will pivot about the semi-circular undercut 2. Tube grip occurs at this point when the claw end's teeth 5 make contact 25 with the tube 18 as shown in FIG. 11. Ideally all teeth will make contact at the same point during actuation, however this is not essential.

Figure 13:
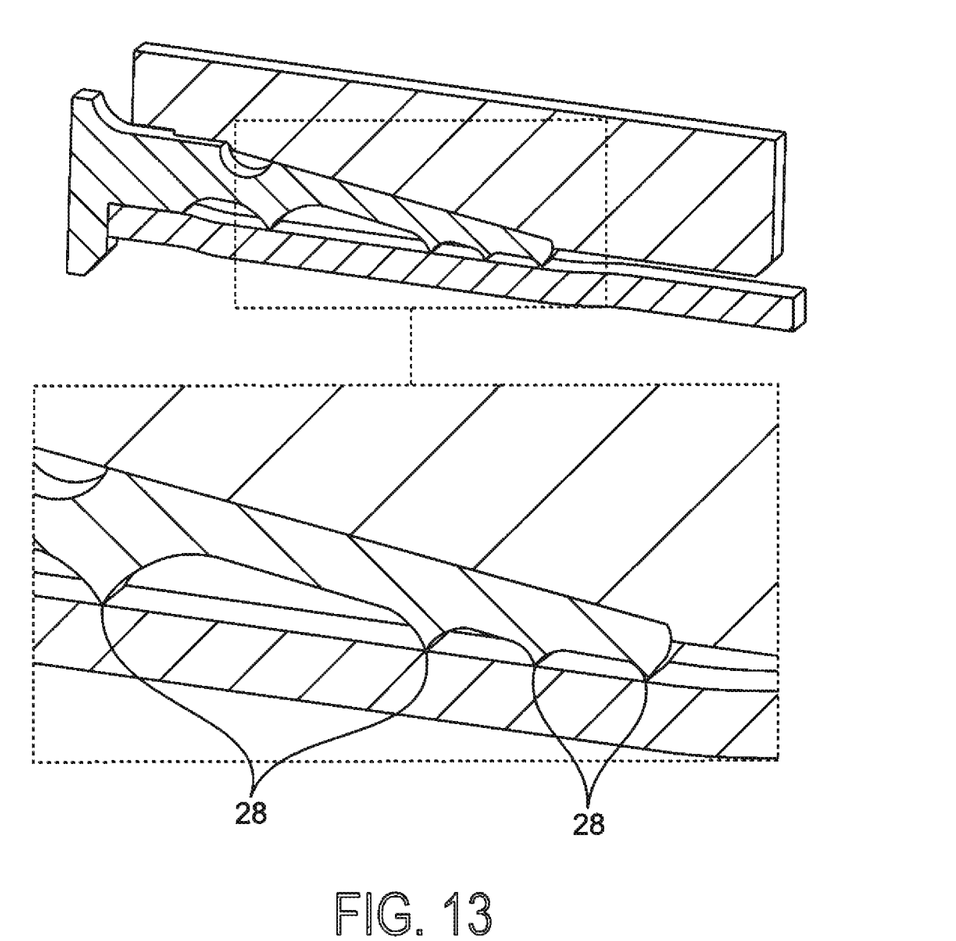
FIG. 13 shows an alternative view of a collar fitted over an inner member.

The teeth 5 will primarily cut into the outer skin of the tubing 18 until a point where the forces required to cut into the skin become larger than the forces required to deform the tube. At this point the tube 18 will begin to deform 27. As shown in FIG. 12, this will result in the tube swelling in some areas and in some areas contracting. This deformation combined with the initial tube bite produces two outcomes that are particularly advantageous when considering a tube/pipe fitting. Firstly a high quality seal is achieved between the tube 18 and the internal form/teeth 5 of the claw end. These seal points 28 are shown in FIG. 13. Please note the seal points shown in this example are dependent upon the number of teeth and their position and can be varied as required.

When fully compressed as shown in FIG. 12, the tube 18 is also deformed 27 resulting in a form that cannot be removed from the claw end. This tube bite/compression is shown in FIG. 13. The outer skin of the tubing is broken 28 by each tooth 5. This results in an enhanced seal due to the fact that the skin of tube/pipe has a higher level of hardness than the core material due to cold forming processes used in its manufacture.

Embodiments of this invention address the issues currently encountered with the existing design as follows:

Embodiments of the invention can be manufactured from standard commercial material and require no enhancements. However, enhancements can be offered to meet the future demands of our ever changing industry needs. As an example, higher pressures/temperatures may require enhanced properties within the material or the material may require additional processing.

No treatment processes are required within the components of this design Which reduces the corrosion resistance of the surfaces. However, enhancements can be offered to meet the future demands of our ever changing industry needs. As an example, higher pressures/temperatures may require enhanced properties within the material or the material may require additional processing.

Embodiments of the invention are more tolerant to standard tubing and thus no special restrictions of some properties such as skin hardness need to be made.

Embodiments of the invention are tolerant to poorly prepared tubing.

Longitudinal scratches on the tube do not pose a problem to embodiments of the invention as the initial bite of the teeth cuts through the skin.

The coupling can be manufactured in materials which are compatible with various standards such as NACE.

The methods used to assemble the coupling to the tube can rely on either a thread or a mechanical tool, both of which can assemble to a dead stop or pre-determined torque.

The examples shown above utilise a body, which contains the claw end profile. However it should be noted that embodiments of the invention could accommodate the claw end body being made of two individual items, the first containing the external frusto-cone, the internal bore that contains the teeth and a sealing portion to seal between either sections of the body and the second would contain a sealing portion, to seal between either sections of the body, and a threaded portion that a nut would connect with.

Figure 14:
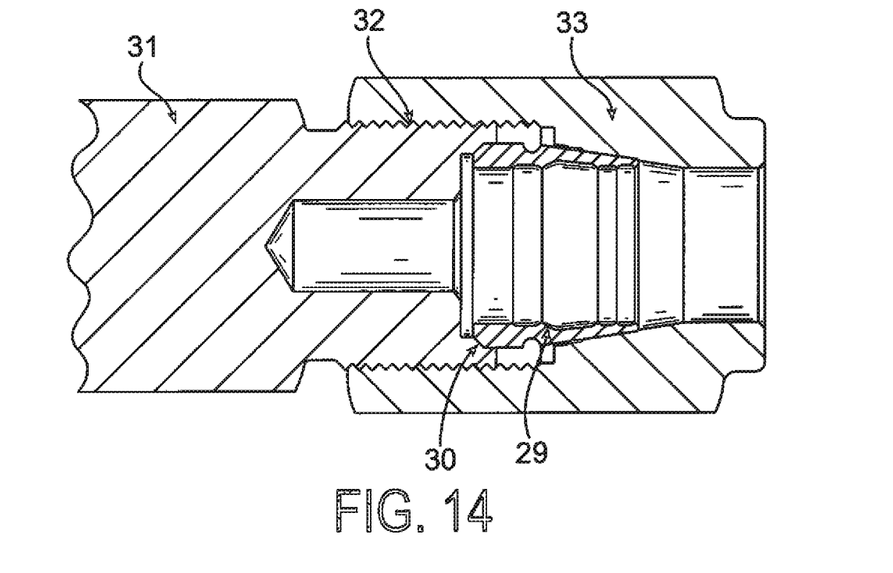
FIG. 14 shows a cross-sectional view of a further embodiment of a collar and an inner member.

An example of this is shown in FIG. 14. In this example the sealing arrangement previously discussed as the claw end is now generated as a ferrule 29. This ferrule contains the same internal and external profile as the claw end including the teeth 5, the external frusto-cone 1 and the semi-circular groove 2. However in addition to these profiles there is also a sealing surface 30 used to generate a seal between the ferrule and the secondary body 31. The secondary body 31 contains the mating sealing surface 30. It also contains a plain bore that serves the same purpose as the plain bore of the claw end 7. Externally the secondary body 31 contains a male thread 32 that is used to screw the collar, in this example in the form of a nut 33, onto the secondary body 31. It is this thread 32, which generates the force required to deform the ferrule 29 in the same way as the claw end was deformed in the previous example.

Figure 15:
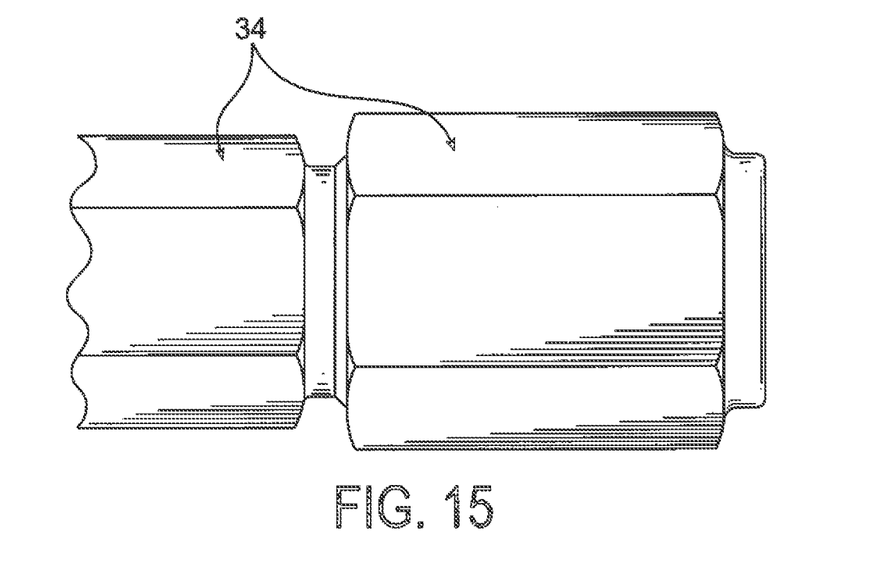
FIG. 15 shows a perspective view of the embodiment shown in FIG. 14.

It should be noted that in this example both the body 31 and the nut 33 contain means by which a rotational force can be transferred to the thread. FIG. 15 shows a hexagonal form 34 on both components. However, this is not essential as any form capable of being rotated will be acceptable such as a square form or two or more flats on a diameter.

Additionally the threads on the secondary body and nut could be inverted such that the secondary body contains the female thread and the nut contains the male thread. The ferrule 29 would then sit within a part of the body. This version would be particularly suited for use within existing equipment such as valves and manifolds. Both of the ferrule designs mentioned above could be used as termination style product, i.e. they would be utilised at points within a tubing/piping system where the connection needs to be disconnected.

Figure 16:
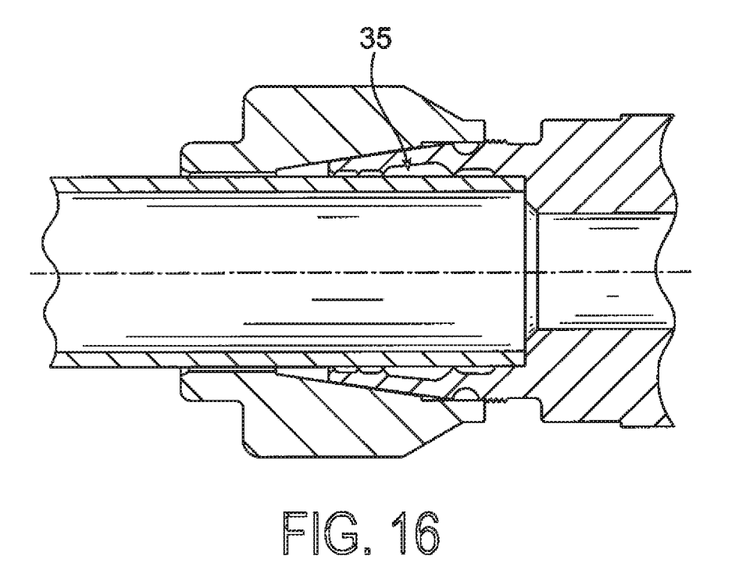
FIG. 16 shows a farther cross-sectional view of a collar and an inner member.

Many variations may be made to the examples of the invention discussed above without departing from the scope of the invention. For example by increasing or decreasing the number of teeth within the claw end/ferrule, the sealing and tube retention properties would alter accordingly. A female screw thread may be provided in the interior of the claw end. The screw thread may replace one or more of the interior annular protuberances. A screw thread is generally easier to manufacture than an interior annular protuberance. For example, one, two or three of the interior annular protuberances which may be nearest to the open end of the claw end may be replaced by a screw thread. However, when a screw thread is provided, there is preferably still at least one interior annular protuberance still provided in the interior of the claw end to engage a tube/pipe or the like to be inserted into the claw end. In use the screw thread will deform in a similar manner to the annular protuberances which will in turn cause the tube/pipe or the like to deform and thus cause a "bite" effect. It should also be noted that in some applications users may require the addition of a 'soft' seal, which would be placed in the recess 35 shown in FIG. 16 created between the claw end/ferrule and the tube. This recess will reduce in volume during compression of the collar/nut and thus result in compression of the 'soft' seal.

All of the above described components could be manufactured from an material including metallic and non-metallic materials, in addition to this by increasing the mechanical properties such as hardness of the teeth 5 the tube bite would be dramatically enhanced. The coupling described above can be used with a tube or the like made from any material. However, a tube or the like made from metal is preferred. Such methods as already used in the twin ferrule industry could be used to generate these enhanced mechanical properties.

The following major differences between embodiments of the present invention and the prior art should be observed.

Unlike the circumferential compressive three applied to deform the inner body such that the one or more annular protuberances engage a tube or the like in embodiments of the present invention, conventional twin ferrule fittings use a knurled effect within the body to grip the tube. This knurled section does not produce a seal or bite/cut into the outer skin of the tube. The seal with this style of fitting is achieved by the internal profile of the body nose and the tube profile being forced together to produce a compressed/moulded form which produces a seal but does not bite into the tube.

It should also be noted that these conventional couplings are rated to far lower pressure ratings than embodiments of the invention described herein, and are limited to what tube wall thickness can be used.

As it is anticipated that certain changes may be made in the present invention without departing from the precepts herein involved, it is intended that all matter contained in the foregoing description shall be interpreted as illustrative and not in a limiting sense.

What is claimed is:

1. A fitting assembly connected to an end of a length of tubing having a tubing wall, the fitting assembly comprising:
   a body having a socket portion, the socket portion having a forward end opening into an internal bore into which a tubing end is insertably received, the bore having a generally annular inner surface, and the body socket portion having a generally annular outer surface including an inclined portion tapering to the body forward end, the bore inner surface having a number of teeth, a rearwardmost one of the teeth being spaced-apart rearwardly axially from the rest of the teeth, with said rest of the teeth being disposed adjacent the body forward end and on a portion of the inner bore surface that is axially aligned with the inclined portion of the outer surface; and
   a generally annular collar received coaxially over the tubing, the collar having a forward end and a rearward end portion received coaxially over the outer surface of the body socket portion, the collar rearward end portion having a generally annular inner surface including an inclined portion tapering towards the collar forward end,
   whereby with the collar rearward end portion having been moved over the body socket portion effecting a camming engagement of the inclined portion of the body socket portion outer surface against the inclined portion of the collar inner surface, the body socket portion is radially compressed about the tubing wherein such compression initially causes the teeth to grippingly bite into the tubing wall and thereafter to deform the tubing wall between said one of the teeth and said rest of the teeth delimiting the removal of the tubing end from the body socket portion.

2. The fitting assembly of claim 1 wherein the collar inner surface has an engagement portion located rearward of the inclined portion thereof and the body outer surface has an engagement portion located rearward of the inclined portion thereof, the collar and body engagement portions being engaged to retain the collar on the body in a preassembled arrangement of the fitting assembly when the tubing is inserted into the internal bore of the body through the collar.

3. The fitting assembly of claim 1 wherein each of the teeth is axially spaced-apart and the one of the teeth is spaced-apart rearwardly from the nearest one of the rest of the teeth at a distance greater than the spacing between the rest of the teeth.

4. A tubing connection comprising:
   a length of tubing having an end and a tubing wall;
   a body having a socket portion, the socket portion having a forward end opening into an internal bore into which the tubing end is insertably received, the bore having a generally annular inner surface, and the body socket portion having a generally annular outer surface including an inclined portion tapering to the body forward end, the bore inner surface having a number of teeth, a rearwardmost one of the teeth being spaced-apart rearwardly axially from the rest of the teeth, with said rest of the teeth being disposed adjacent the body forward end and on a portion of the inner bore surface that is axially aligned with the inclined portion of the outer surface; and
   a generally annular collar received coaxially over the tubing, the collar having a forward end and a rearward end portion received coaxially over the outer surface of the body socket portion, the collar rearward end portion having a generally annular inner surface including an inclined portion tapering towards the collar forward end,
   whereby with the collar rearward end portion having been moved over the body socket portion effecting a camming engagement of the inclined portion of the body socket portion outer surface against the inclined portion of the collar inner surface, the body socket portion is radially compressed about the tubing wherein such compression initially causes the teeth to grippingly bite into the tubing wall and thereafter to deform the tubing wall between said one of the teeth and said rest of the teeth delimiting the removal of the tubing end from the body socket portion.

5. The tubing connection of claim 4 wherein the collar inner surface has an engagement portion located rearward of the inclined portion thereof and the body outer surface has an engagement portion located rearward of the inclined portion thereof, the collar and body engagement portions being engaged to retain the collar on the body in a preassembled arrangement of the fitting assembly when the tubing end is inserted into the internal bore of the body through the collar.

6. The tubing connection of claim 4 wherein each of the teeth is axially spaced-apart and the one of the teeth is spaced-apart rearwardly from the nearest one of the rest of the teeth at a distance greater than the spacing between the rest of the teeth.

7. A method of making a tubing connection comprising the steps of:
   (a) providing a length of tubing having an end and a tubing wall;
   (b) providing a fitting assembly comprising:
      a body having a socket portion, the socket portion having a forward end opening into an internal bore for receiving the tubing end, the bore having a generally annular inner surface and the body socket portion having a generally annular outer surface including an inclined portion tapering to the body forward end, the bore inner surface having a number of teeth, a rearwardmost one of the teeth being spaced-apart rearwardly axially from the rest of the teeth, with said rest of the teeth being disposed adjacent the body forward end and on a portion of the inner bore surface that is axially aligned with the inclined portion of the outer surface, and a generally annular collar receivable coaxially over the tubing, the collar having a forward end and a rearward end portion receivable coaxially over the outer surface of the body socket portion, the collar rearward end portion having a generally annular inner surface including an inclined portion tapering towards the collar forward end;

(c) receiving the collar over the tubing;

(d) inserting the end of the tubing into the internal bore of the body; and (e) moving the collar rearward end portion over the body socket portion to effect a camming engagement of the inclined portion of the body socket portion outer surface against the inclined portion of the collar inner surface and radial compression of the body socket portion about the tubing wherein such compression initially causes the teeth to grippingly bite into the tubing wall and thereafter to deform the tubing wall between said one of the teeth and said rest of the teeth delimiting the removal of the tubing end from the body socket portion.

8. The method of claim 7 further comprising engaging an engagement portion of the collar inner surface located rearward of the inclined portion thereof with an engagement portion of the body outer surface located rearward of the inclined portion thereof to retain the collar on the body in a preassembled arrangement of the fitting assembly.

\* \* \* \* \*